(12) United States Patent
Aoki

(10) Patent No.: US 6,443,573 B2
(45) Date of Patent: Sep. 3, 2002

(54) ON-VEHICLE DISPLAY UNIT

(75) Inventor: Kunimitsu Aoki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/907,624

(22) Filed: Jul. 19, 2001

(30) Foreign Application Priority Data

Aug. 10, 2000 (JP) ...................................... 2000-242669
Aug. 10, 2000 (JP) ...................................... 2000-242671

(51) Int. Cl.$^7$ .............................................. G03B 21/00
(52) U.S. Cl. .............................. 353/13; 353/28; 353/69; 345/7
(58) Field of Search ............................. 353/13, 28, 69; 345/7

(56) References Cited

U.S. PATENT DOCUMENTS

| 5,400,045 A | * | 3/1995 | Aoki ............................... 345/7 |
| 5,557,353 A | * | 9/1996 | Stahl ............................ 353/69 |
| 5,782,547 A | * | 7/1998 | Machtig et al. ................ 353/28 |
| 5,867,133 A | * | 2/1999 | Toffolo et al. .................. 345/7 |

FOREIGN PATENT DOCUMENTS

| JP | 5-229366 | 9/1993 |
| JP | 4-257228 | 10/1995 |

* cited by examiner

*Primary Examiner*—Russell Adams
*Assistant Examiner*—Michelle Nguyen
(74) *Attorney, Agent, or Firm*—Armstrong, Westerman & Hattori, LLP

(57) ABSTRACT

An on-vehicle display unit projects an image, which is displayed on a display in a dashboard, on a screen disposed outside the dashboard. The screen is transparent so that the foreground is visible through the screen with the image projected on the screen being superimposed over the foreground. A reflecting mirror is disposed in the dashboard for reflecting light emitted from the image displayed on the display toward the screen. A semi-transparent mirror is disposed in the dashboard between the display and the reflecting mirror. The semi-transparent mirror is able to pass partially and to reflect partially light emitted from the image on the display. An angle changing mechanism selectively changes the semi-transparent mirror relative to a longitudinal direction of the vehicle into a first inclination angle position or into a second inclination angle position. The semi-transparent mirror partially reflects the light emitted from the image displayed on the display toward the screen when the semi-transparent mirror is at the first inclination angle position, and the semi-transparent mirror partially reflects the light reflected by the reflecting mirror toward the screen when the semi-transparent mirror is at the second inclination angle position.

7 Claims, 4 Drawing Sheets

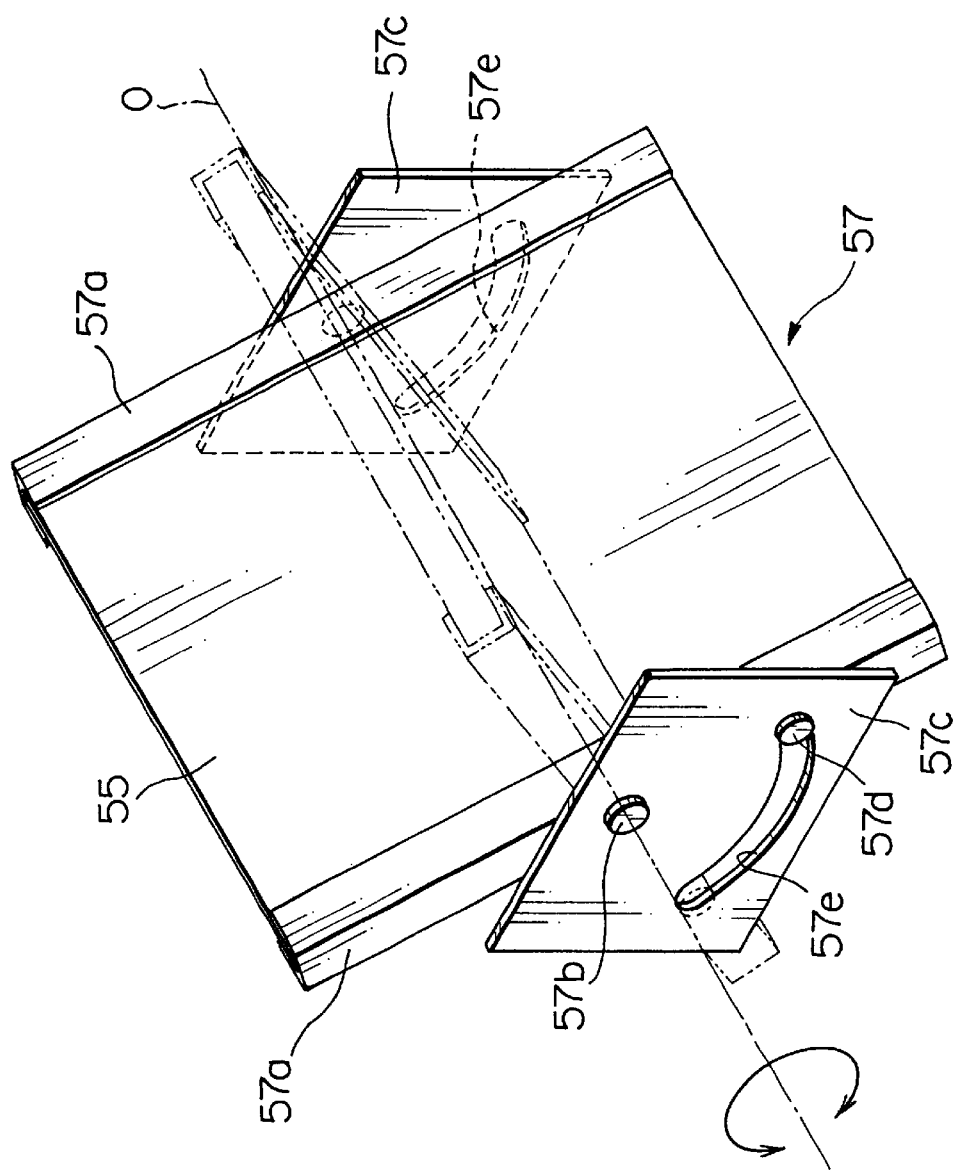

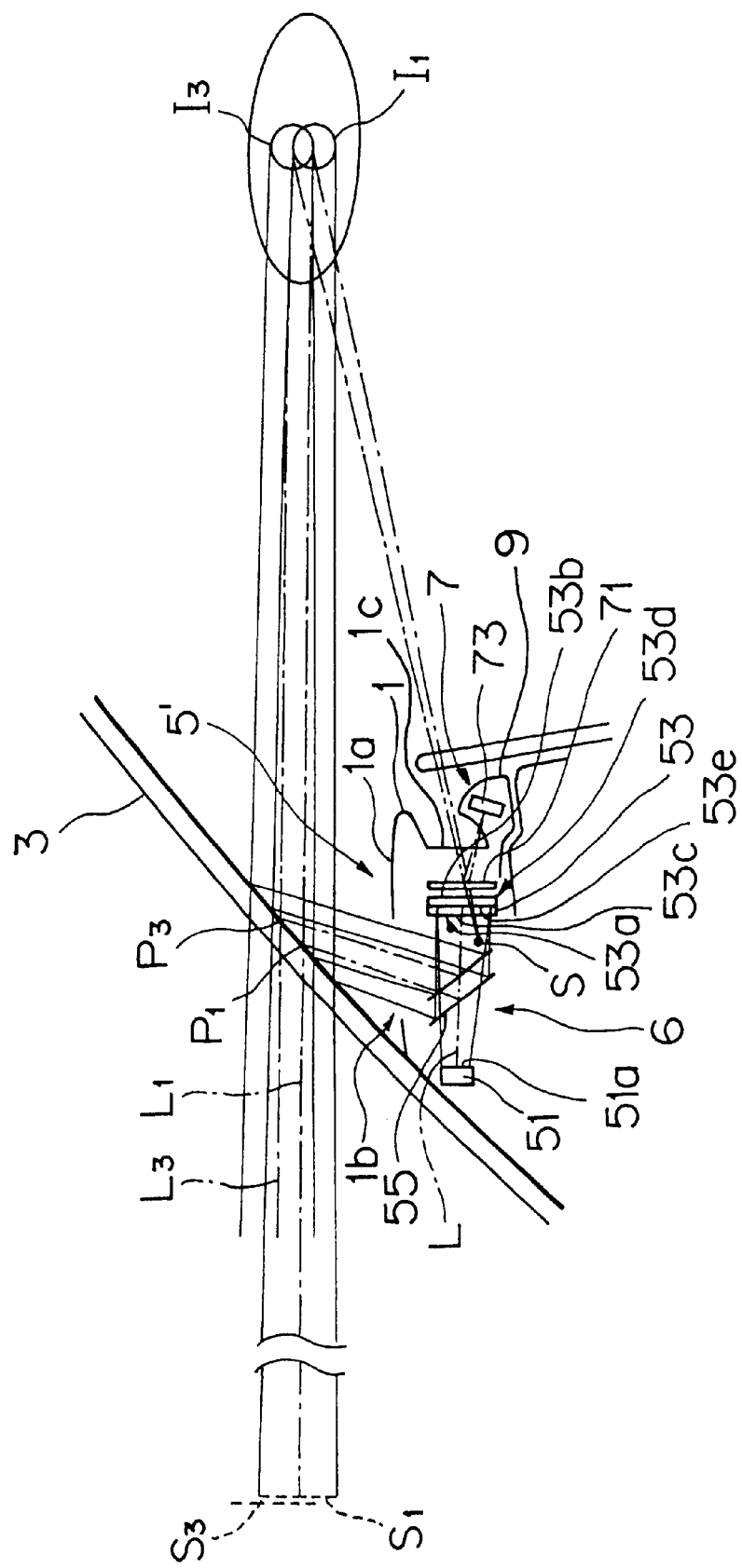

ON-VEHICLE DISPLAY UNIT

BACKGROUND OF THE INVENTION

1. Field of the Invention

The present invention relates to an on-vehicle display unit having a projecting sub-unit that projects an image, which is displayed on a display disposed in a dashboard of a vehicle, on a windscreen or an auxiliary screen. The image is superimposed over the fore ground which can be seen through the windscreen or the auxiliary screen.

2. Related Art

Recently, with increase of information for operation of a vehicle, an auxiliary display unit, which is called as a head-up display, is used to allow a driver to see additional information necessary for the vehicle operation which is over the capacity of indicators of the vehicle. The additional information is superimposed over the foreground visible through a wind screen of the vehicle without a larger change of a sight line of the driver.

In such on-vehicle display units, it is desired that sight distances do not vary too much when the driver frequently changes his sight between the superimposed information and the foreground. Therefore, a larger optical distance from a display of the information to the windscreen is preferably provided so that a sight point of a superimposed virtual image is nearer to the foreground.

However, the elongated sight distance of the virtual image is disadvantageous when the vehicle is stopping. That is because the driver will desire to clearly see the superimposed information.

SUMMARY OF THE INVENTION

As described above, such types of on-vehicle display units preferably make a focused point of a superimposed virtual image nearer to the foreground during an operation state of the vehicle, while the focused point is preferably positioned nearer to an eye position of a driver during a stopping state of the vehicle. To achieve both the focused points, a display may be moved to change an optical path distance from the display to a screen. However, the movement of display is undesirable, because it requires an enlarged space for receiving the display.

Such a display is generally accommodated in a dashboard. The display may be mounted on a ceiling of the vehicle, but the arrangement of the display near the head of a driver may make the driver feel pressure.

However, it is not practical that the dashboard is expanded forward, because the dashboard is forwardly adjacent to an engine room of the vehicle. Furthermore, it is undesirable for the driver that the virtual image on the windscreen is moved in a lateral direction of the vehicle.

Therefore, the dashboard can be expanded only backward to accommodate the display of the display unit in the dashboard.

However, the dashboard is provided with instruments such as a speed meter and a tachometer at a rear side thereof. If the instruments are disposed nearer to the driver due to the backward expansion of the dashboard, the driver needs a much change of a sight distance to change his sight between the instruments and the foreground.

In view of the aforementioned situations, a first object of the invention is to provide an on-vehicle display unit which can project an image displayed on a display in a dashboard toward a windscreen disposed outside the dashboard, thereby superimposing the image over the foreground visible through the windscreen. The on-vehicle display unit can move the superimposed image nearer to the foreground and away from the foreground in accordance with a kind of information included in the image. This configuration requires little enlargement of the accommodation space of the dashboard.

For achieving the first object of the invention, a first aspect of the invention is an on-vehicle display unit for projecting an image on a screen, the image displayed on a display in a dashboard of a vehicle, the screen disposed outside the dashboard, the screen being transparent so that the foreground is visible through the screen with the image projected on the screen being superimposed over the foreground. The on-vehicle display unit includes:

a reflecting mirror disposed in the dashboard for reflecting light emitted from the image displayed on the display toward the screen, a semi-transparent mirror disposed in the dashboard between the display and the reflecting mirror, the semi-transparent mirror being able to pass partially and to reflect partially light emitted from the image on the display, and an angle changing mechanism for selectively changing the semi-transparent mirror relative to a longitudinal direction of the vehicle into a first inclination angle position or a second inclination angle position, wherein the semi-transparent mirror partially reflects the light of the image displayed on the display toward the screen when the semi-transparent mirror is at the first angle position, and the semi-transparent mirror partially reflects light reflected by the reflecting mirror toward the screen when the semi-transparent mirror is at the second angle position.

Thus, the semi-transparent mirror is selectively changed into the first inclination angle position or into the second inclination angle position. At the first angle position, light emitted from the image displayed on the display is reflected by the semi-transparent mirror toward the screen, thereby providing a shorter optical path from the display to the screen. Meanwhile, at the second angle position, light emitted from the image displayed on the display passes through the semi-transparent mirror to reach the reflecting mirror so that the light is reflected by the reflecting mirror to come again to the semi-transparent mirror which reflects the light toward the screen, thereby providing a longer optical path from the display to the screen. This allows the changeable position of the image from an eye of the driver with no movement of the display.

Preferably, the angle changing mechanism has a shaft extended in a lateral direction of the vehicle for turning the semi-transparent mirror around the shaft to selectively change the semi-transparent mirror into the first angle position or into the second angle position.

Thus, the semi-transparent mirror is easily changed to the first position or to second position by turning the semi-transparent mirror around the shaft.

Preferably, the on-vehicle display unit further has an image magnifying optical element disposed in the dashboard such that light from the reflecting mirror to the semi-transparent mirror passes through the image magnifying optical element for magnifying the image.

Thus, a virtual image with an appropriate size is visible by way of the screen at the second position of the semi-transparent mirror, although an optical path from the display to the screen is elongated by the provision of the reflecting mirror to make the sight distance of the image nearer to the foreground.

Preferably, the image magnifying optical element is a Fresnel lens having a flat surface at one side thereof and a Fresnel surface at the other side thereof, the flat surface facing the reflecting mirror in an optical direction of the image emitted from the display.

Thus, the Fresnel lens is positioned between the semi-transparent mirror and the reflecting mirror so as not to prevent change over of the semi-transparent mirror between the first and second positions. Thereby, the display unit is capable of the magnification of the superimposed image and is capable of the selection of the sight distances of the image.

A second object of the invention is to provide an on-vehicle display unit which can project an image displayed on a display in a dashboard toward a windscreen disposed outside the dashboard, thereby superimposing the image over the foreground visible through the windscreen. The on-vehicle display unit can position the superimposed image nearer to the foreground even when a projecting sub-unit is disposed in the dashboard. In the on-vehicle display unit, a driver can also see indications of measuring instruments such as a speed meter.

For achieving the second object of the invention, a second aspect of the invention is an on-vehicle display unit having a projecting sub-unit disposed in the dashboard for projecting an image on a first screen disposed above the dashboard, the image displayed on a first display in a dashboard of a vehicle, the first screen being transparent so that the foreground is visible from an eye position of a driver through the first screen with the image projected on the screen being superimposed over the foreground, the on-vehicle display unit includes:

a second screen disposed nearer to the eye position than the projecting sub-unit for projection of data obtained by measuring instruments of the vehicle, the second screen being visible directly from the eye position and a second display disposed nearer to the eye position than the dashboard for indicating the data of the measuring instruments, wherein a virtual image of the data obtained by the measuring instruments is visible from the eye position by way of the second screen.

Thus, in the on-vehicle display unit, the driver can see both the data obtained by the measuring instruments and the foreground with a less difference of sight distances thereof. Because, the second screen is disposed to project the data of measuring instruments of the vehicle.

Preferably, the projecting sub-unit has a reflecting mirror for reflecting light emitted from the image displayed on the first display toward the first screen.

Thus, the projecting sub-unit can elongate an optical path from the first display to the screen.

Preferably, the projecting sub-unit has a second reflecting element spaced from the first display in a longitudinal direction of the vehicle, and the reflecting mirror is a semi-transparent mirror which can pass partially light emitted from the first display toward the second reflecting element, the second reflecting element reflecting the light toward the semi-transparent mirror such that the light is reflected toward the first screen by the semi-transparent mirror.

Thus, the light emitted from the image displayed on the first display passes through the semi-transparent mirror to reach the second reflecting element so that the light is reflected by the second reflecting element to come again to the semi-transparent mirror which reflects the light toward the screen, thereby providing a longer optical path from the first display to the first screen.

Preferably, the second screen is another reflecting mirror, and the on-vehicle display unit has a combined plate extended substantially perpendicular to an optical axis of light emitted from the image displayed on the display, the combined plate having a first surface facing the display and a second surface facing the eye position, the second reflecting element defined in the first surface, the second screen defined in the second surface.

Thus, the second reflecting element and the reflecting mirror of the second screen are defined by the combined plate to be better for simplification of the display unit.

Preferably, the reflecting mirror of the projecting sub-unit is movable in an optical axis direction of the light emitted from the image displayed on the first display.

Thus, the on-vehicle display unit allows the driver to see both the data of the measuring instruments and the foreground with a less difference of sight distances thereof. Because, the reflecting mirror is movable in an optical axis direction of the light emitted from the image displayed on the first display.

BRIEF DESCRIPTION OF THE DRAWINGS

FIG. 2 is an enlarged side view showing a magnifying mirror of FIG. 1;

FIG. 3 is an enlarged perspective view showing a turning mechanism of a semi-transparent mirror of FIG. 1;

FIG. 4 is a sectional view illustrating a basic configuration of an on-vehicle display unit of a second embodiment according to the present invention;

DETAILED DESCRIPTION OF PREFERRED EMBODIMENTS

Referring to the accompanied drawings, embodiments of on-vehicle display units according to the present invention will be discussed hereinafter.

Figure 1:
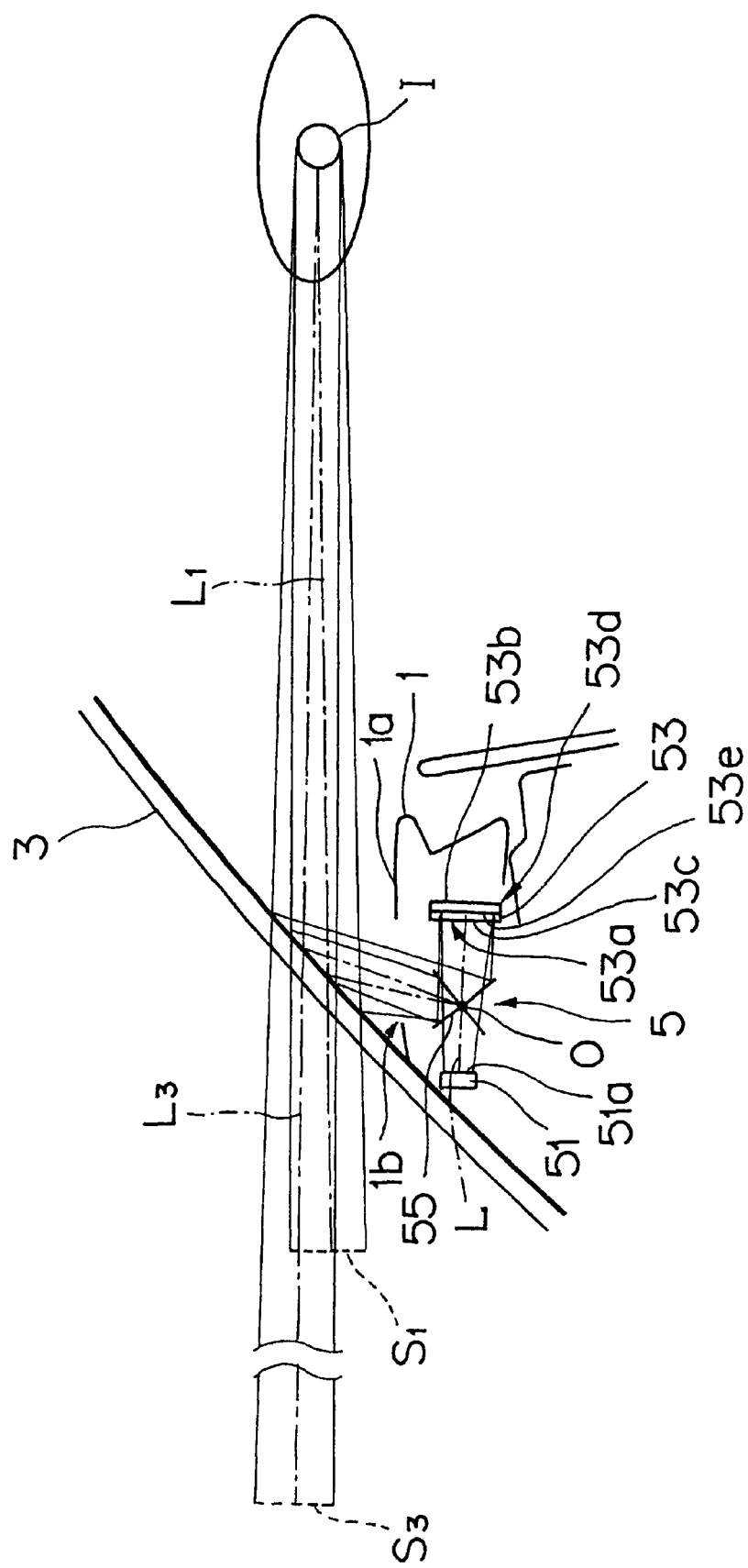
FIG. 1 is a sectional view illustrating a basic configuration of an on-vehicle display unit of an embodiment according to the present invention.

FIG. 1 is a schematic sectional view illustrating a general configuration of an embodiment of an on-vehicle display unit according to the present invention. In FIG. 1, reference numeral 5 designates an on-vehicle display unit which is accommodated in a dashboard 1 of a vehicle. The on-vehicle display unit 5 projects an image, which is displayed on a display disposed in the dashboard, on a windscreen 3 (corresponding to the screen described in the invention summary), the image being superimposed over the foreground which can be seen through the windscreen. The windscreen 3, which is disposed above an upper surface 1a of the dashboard 1, has a substantially uniform inclination relative to a longitudinal direction of the vehicle.

The on-vehicle display unit 5 includes a display 51, a magnifying mirror 53, a semi-transparent mirror 55, a mirror turning mechanism 57 (see FIG. 3), etc.

The display 51 is a light-emitting device display (for example, a field-emission display, an electron-ray indicator tube, an electroluminescence display, etc.), a liquid-crystal display having a backlight, or the like. The display 51 has a display panel 51a facing in a backward direction of the vehicle. On the display panel 51a, there is selectively provided an image (not shown) including information related to the navigation of the vehicle or another image including information related to an operation state of the vehicle during a stopping state or a running state of the vehicle.

The magnifying mirror 53, which is illustrated in FIG. 2, is constituted by a Fresnel lens 53a (corresponding to the image magnifying optical element described in the invention summary) and a reflecting mirror 53d (corresponding to the second reflecting element described in the invention summary). The Fresnel lens 53a has a flat surface 53b, and the mirror 53d has a reflection surface 53e. The flat surface 53b is brought into intimate contact with the reflection surface 53e by evaporation. The Fresnel lens 53a has a Fresnel surface 53c in the opposite side of the flat surface 53b. As illustrated in FIG. 1, the Fresnel surface 53c faces the display panel 51a of the display 51 with a space therebetween in a backward direction of the vehicle.

The semi-transparent mirror 55 is supported by the turning mechanism 57 such that the semi-transparent mirror 55 aligns with an optical axis L of an image (not shown) emitted from the display 51 to the magnifying reflecting mirror 53.

As more particularly illustrated in FIG. 3, the turning mechanism 57 has a pair of support frames 57a, 57a each parallel extended in a longitudinal direction of the vehicle, a support pin 57b provided at a middle portion of each support frame 57a, and a pair of support plates 57c, 57c turned around an axis O perpendicular to a longitudinal direction of the vehicle.

Each support frame 57a is provided with a guide pin 57d longitudinally spaced from the support pin 57b. Each support plate 57c is formed with an arcuate guide slot 57e which is inserted by the guide pin 57d such that the support plate 57c is turnable around the support pin 57b. The turnable range of the support plate 57c is limited by the arcuate slot 57e.

The turning mechanism 57 has a driving means (not shown), which may be an electrical one like a motor or a hand assisted one like a dial for turning the support frame 57a around the support pin 57b. Thereby, the semi-transparent mirror 55 positioned between the display 51 and the magnifying reflecting mirror 53 is selectively turned into a first inclination angle position or into a second inclination angle position. In FIG. 1, the semi-transparent mirror 55 is inclined toward the magnifying reflecting mirror 53 at the first angle position as illustrated by a solid line. Meanwhile, the semi-transparent mirror 55 is inclined toward the display 51 at the second angle position as illustrated by a phantom line.

In the upper surface 1a of the dashboard 1, there is formed an opening 1b for emitting the light of the image (not shown) from the dashboard 1 toward the windscreen 3.

Next, an operation of thus configured on-vehicle display unit 5 of the embodiment will be discussed.

In the first angle position of the semi-transparent mirror 55 which is illustrated by a solid line in FIG. 1, the display 51 indicates an image (not shown) including information concerning vehicle navigation. Such information is generally used during a stopping state of the vehicle. The image is emitted from the display panel 51a of the display 51 to the semi-transparent mirror 55 disposed between the display panel 51a and the magnifying mirror 53 opposed to the display panel 51a.

Since the semi-transparent mirror 55 is inclined toward the magnifying mirror 53 to have the first angle relative to an optical axis L of the emitted image, a part of the received image on the semi-transparent mirror 55 is reflected toward upward. Then, the image is emitted from the opening 1b of the upper surface 1a of the dashboard 1 to reach the windscreen 3 so that the image is projected on the screen 3.

Meanwhile, the other part of the image delivered on the semi-transparent mirror 55 passes through the semi-transparent mirror 55 to come to the magnifying mirror 53. The received image on the magnifying mirror 53 passes through the Fresnel lens 53a from the Fresnel surface 53c to the flat surface 53b thereof. The flat surface 53b is brought into intimate contact with the reflection surface 53e of the mirror 53d which reflects the image toward the Fresnel surface 53c, so that the image passes again through the Fresnel lens 53a toward the display 51.

The image light emitted from the magnifying mirror 53 reaches again the semi-transparent mirror 55. Apart of the image light delivered to the semi-transparent mirror 55 passes through the semi-transparent mirror 55, while the other part of the image light is reflected upward in the dashboard 1 by the semi-transparent mirror 55.

Thus, at the first angle position of the semi-transparent mirror 55, the image displayed on the display 51 is reflected by the semi-transparent mirror 55 to be projected on the windscreen 3. Thereby, a virtual image S1 including the navigation information of the vehicle is visible from an eye position I of the driver by way of the windscreen 3.

Note that the virtual image S1 is spaced from the windscreen 3 by an optical path from the display 51 to the windscreen 3 by way of the semi-transparent mirror 55.

The virtual image S1 is not magnified, because the virtual image is not reflected by the magnifying mirror 53.

At the second position of the semi-transparent mirror 55 which is illustrated by a phantom line in FIG. 1, the display 51 indicates an image (not shown) including information concerning operation conditions of the vehicle. Such information is generally used during an operating state of the vehicle. The image is emitted from the display panel 51a of the display 51 to the semi-transparent mirror 55 disposed between the display panel 51a and the magnifying mirror 53.

Since the semi-transparent mirror 55 is inclined toward the display 51 to have the second predetermined angle relative to an optical axis L of the emitted image, a part of the received image on the semi-transparent mirror 55 is reflected toward a lower side of the dashboard 1, while the other part of the received image passes through the semi-transparent mirror 55 to come to the magnifying mirror 53.

The received image on the magnifying mirror 53 passes from the Fresnel surface 53c to the flat surface 53b thereof through the Fresnel lens 53a. The flat surface 53b is brought into intimate contact with the reflection surface 53e of the mirror 53d which reflects the image toward the Fresnel surface 53c, so that the image passes again through the Fresnel lens 53a toward the display 51.

The image, which has passed through the Fresnel lens 53a twice, is magnified by a light convergence effect of the Fresnel lens 53a. The magnified image reaches the semi-transparent mirror 55 on the way to the display 51.

The image which has reached the semi-transparent mirror 55 again is reflected upward to pass through the opening (or a window) 1b of the upper surface (or a coverplate) 1a of the dashboard 1 to reach the windscreen 3 on which the image is projected.

Thus, at the second angle position of the semi-transparent mirror 55, a virtual image S3 of the information including operating conditions of the vehicle is visible from the eye position I of the driver by way of the windscreen 3.

The virtual image S3 is located more forward in a longitudinal direction of the vehicle than the virtual image S1. Because, the virtual image S3 is located in accordance with an optical path from the display 51 to the windscreen 3 by way of a travel route between the semi-transparent mirror 55 and the magnifying mirror 53.

Note that the virtual image S3 is magnified, because the image light makes a round trip in the Fresnel lens 53a.

Thus, the virtual image S1 including information used during a stopping state of the vehicle is located nearer to the windscreen 3. On the contrary, the virtual image S3 including information used during an operating state of the vehicle is located nearer to the foreground, which eliminates an undesirable sight change of the driver between the virtual image S3 and the foreground.

The magnification of the image by the Fresnel lens 53a of the magnifying mirror 53 may be omitted when undesired. In that case, an ordinary mirror is provided in place of the magnifying mirror 53. However, the magnification of the image by the Fresnel lens 53a is better provided to make a focused point of the virtual image S3 nearer to the foreground visible from the eye position I through the windscreen 3. Because, a lengthened focused point of the image makes the image smaller. Thus, at the second position of the semi-transparent mirror, the magnified virtual image S3 is clearly visible for the driver.

In the embodiment, the turning mechanism 57 turns the semi-transparent mirror 55 to selectively change the semi-transparent mirror 55 into the first angle position and into the second angle position. Alternatively, the on-vehicle display unit may have a pair of semi-transparent mirrors one of which has an inclination angle the same as the first angle position, the other having an inclination angle the same, as the second angle position of the semi-transparent mirror 55. The pair of semi-transparent mirrors each may be selectively moved retractably to cross an optical path between the display 51 and the magnifying mirror 53 by a transfer mechanism (not shown) for each semi-transparent mirror.

For magnification of the image, there may be provided a curved mirror having a spherical surface or another curved surface in place of the Fresnel lens 53a applied for the embodiment. The curved mirror functions substantially the same as the mirror 53d.

For magnification of the image, there may be provided a convex lens in place of the Fresnel lens 53a. The convex lens may have a flat surface at one side thereof, and the flat surface is brought into intimate contact with the mirror 53d by evaporation to define a magnifying mirror. Alternatively, the convex lens may have a curved surface at each side thereof, and the convex lens is separated from the mirror 53d to define a magnifying means.

In the embodiment, the inclination angle of the semi-transparent mirror 55 has been described as a predetermined angle. Actually, the inclination angle is determined in consideration of an inclination of the windscreen 3 at the projection point, the longitudinal and vertical position of the projection point relative to the semi-transparent mirror 55, a sight line direction from the eye positions I of the driver, and etc.

In the embodiment, the screen is discussed as the windscreen 3. However, the screen maybe an auxiliary screen disposed just inside the windscreen 3 on which the image is projected.

A Second Embodiment

FIG. 4 is a schematic sectional view illustrating a general configuration of a second embodiment of an on-vehicle display unit according to the present invention.

Concerning the second embodiment, a constitutional element the same as one of the first embodiment has the same reference numeral as the one of the first embodiment, which will not be discussed again.

In FIG. 4, reference numeral 5' designates the on-vehicle display unit which has an additional information projecting sub-unit 6 and a measured data projecting sub-unit 7.

The additional information projecting sub-unit 6 projects an image, which is displayed on a display 51 disposed in the dashboard, on a windscreen 3 (corresponding to the first screen described in the invention summary). The image is superimposed over the foreground which can be seen through the windscreen 3. The windscreen 3, which is disposed above the upper surface 1a of the dashboard 1, has a substantially uniform inclination relative to a longitudinal direction of the vehicle.

The semi-transparent mirror 55 is supported by a transfer mechanism 67 such that the semi-transparent mirror 55 aligns with an optical axis L of an image (not shown) emitted from the display 51 to the magnifying reflecting mirror 53.

Figure 5:
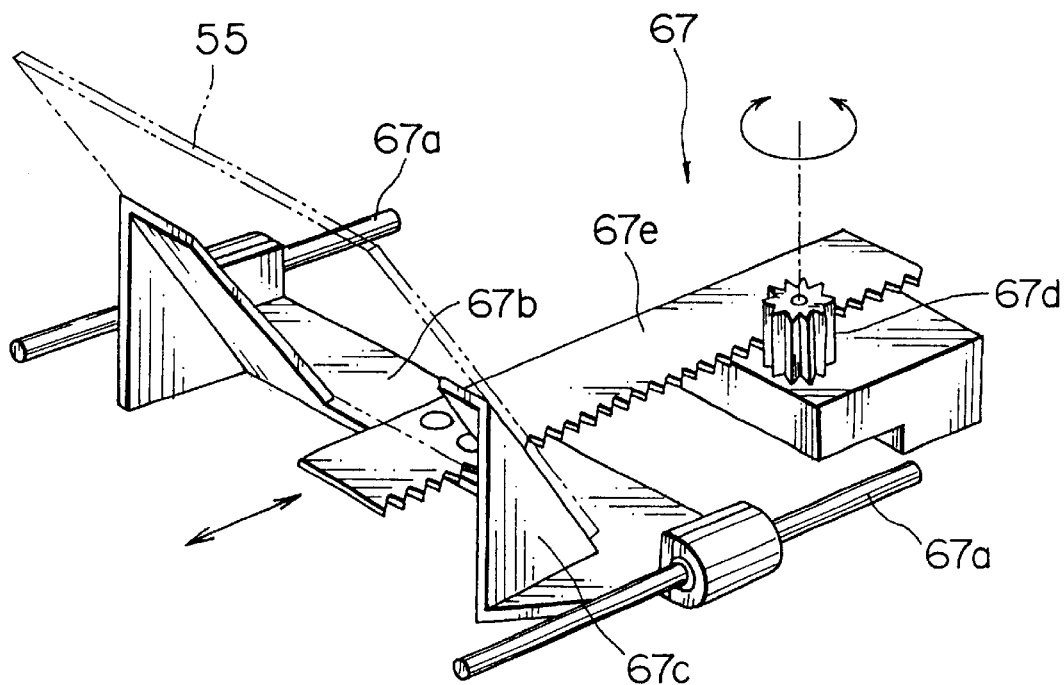
FIG. 5 is an enlarged perspective view showing a transfer mechanism of a semi-transparent mirror of FIG. 4.

As more particularly illustrated in FIG. 5, the transfer mechanism 67 has a pair of the guide shafts 67a, 67a parallel extended in a longitudinal direction of the vehicle, a slide 67b slidable on the guide shafts 67a, 67a, and a holder 67c defined in the slide 67b.

The holder 67c receives the semi-transparent mirror 55 such that, as illustrated in FIG. 1, the semi-transparent mirror 55 is inclined toward the display 51 to have a predetermined angle relative to an optical axis L of the emitted image (not shown). The semi-transparent mirror 55 is located between the display 51 and the magnifying mirror 53 so as to align with the optical axis L. The semi-transparent mirror 55 is movable along the optical axis L, that is, in a longitudinal direction of the vehicle.

As illustrated in FIG. 5, the transfer mechanism 67 further has a pinion 67d located in a side of the dashboard 1 and a rack 67e engageable with the pinion 67d. The rack 67e is fixed on the slide 67b. The turning of the pinion 67d by an electric motor or by hand moves the semi-transparent mirror 55 and the slide 67b in a longitudinal direction of the vehicle in accordance with a vertical position change (described later) between eye positions I1, I3 (FIG. 4).

In this embodiment, the opening 1b is formed in the upper surface 1a of the dashboard 1 for emitting the image light from the dashboard toward the windscreen 3.

The measured data projecting sub-unit 7 has a reflecting mirror 71 (corresponding to the second reflecting element described in the invention summary) disposed on a front surface 1c of the dashboard 1 and has a second display 73 mounted on a steering column 9 which is located diagonally downward from the front surface 1c of the dashboard 1 in a side of the diver. The second display 73 indicates data obtained by measuring instruments of the vehicle.

The second display 73 has a construction similar to one of types described for the display 51.

The second display 73 has an indication face 73a opposed to the reflecting mirror 71 for indicating an image (not shown) concerning data obtained by measuring instruments such as a vehicle speed, an engine revolution number, a residual amount of fuel, and a water temperature of a radiator.

The reflecting mirror 71 is inclined forward by a predetermined angle relative to the front surface 1c of the dashboard 1 such that the whole image on the indication face 73a of the second display 73 is visible from the eye position I1 or I3 by way of the reflecting mirror 71.

In the projecting sub-unit 6 having the semi-transparent mirror 55 which is illustrated by a solid line in FIG. 4, the display 51 indicates an image (not shown) including information concerning operation of the vehicle. The image is emitted from the display panel 51a of the display 51 to the semi-transparent mirror 55 disposed between the display panel 51a and the magnifying mirror 53.

Since the semi-transparent mirror 55 is inclined toward the display 51 to have a predetermined angle relative to an optical axis L of the emitted image, a part of the received image on the semi-transparent mirror 55 is reflected toward a lower side of the dashboard 1, while the other part of the received image passes through the semi-transparent mirror 55 to come to the magnifying mirror 53.

The delivered image on the magnifying mirror 53 passes through the Fresnel lens 53a from the Fresnel surface 53c to the flat surface 53b thereof. The flat surface 53b is brought into intimate contact with the reflection surface 53e of the mirror 53d which reflects the image toward the Fresnel surface 53c, so that the image passes again through the Fresnel lens 53a toward the display 51.

The image, which has passed through the Fresnel lens 53a twice, is magnified by a light convergence effect of the Fresnel lens 53a. The magnified image reaches the semi-transparent mirror 55 on the way to the display 51.

The image which has reached the semi-transparent mirror 55 again is reflected upward to pass through the window 59b of the cover plate 59a of the dashboard 1 to reach the windscreen 3 on which the image is projected.

Hence, a vehicle driver can see a virtual image S1 projected at a projection point P1 of the windscreen 3. The projection point P1 is positioned on a sight line L1 of the driver who is looking at the foreground located approximately 10 to 20 meters ahead from the vehicle through the windscreen 3. An eye position I1 of the driver is positioned back of the projection point P1 of the image on the windscreen 3. The 10 to 20 meters distance from the vehicle to the focused foreground is generally appropriate during operation of the vehicle.

The semi-transparent mirror 55 is moved backward to a second position illustrated by a phantom line as shown in FIG. 4, so that the image displayed on the display panel 51a of the display 51 is emitted to pass through the semi-transparent mirror 55 and to make a round-trip in the Fresnel lens 53a. Then, the image magnified by the Fresnel lens 53a reaches the semi-transparent mirror 55 on the way to the display 51, and a part of the magnified image is reflected upward by the semi-transparent mirror 55 toward the dashboard 1, which passes through the opening 1b of the upper surface 1a of the dashboard 1 to be projected on the windscreen 3.

Since the semi-transparent mirror 55 is moved backward, a projection point P3 of the image on the windscreen 3 is moved above the projection point P1 corresponding to the first position of the semi-transparent mirror 55. Thus, the projection point P3 is positioned on a sight line L3 of the driver who is looking at the foreground located approximately 10 to 20 meters ahead from the vehicle through the windscreen 3. Thus, a virtual image S3 is superimposed over the foreground. The eye position I3 of the driver is positioned just back of the projection point P3 of the image on the windscreen 3.

Hence, an upward movement of the driver's eye position requires a backward movement of the semi-transparent mirror 55, while a downward movement of the driver's eye position requires a forward movement of the semi-transparent mirror 55 so that the image is positioned on a sight line which allows the driver to see the foreground approximately 10 to 20 meters ahead from the vehicle.

Meanwhile, in the measured data projecting sub-unit 7, the second display indicates an image (not shown) concerning data obtained by measuring instruments such as a vehicle speed, an engine revolution number, a residual amount of fuel, and a water temperature of a radiator. The image is emitted from the indication face 73a of the display 73 to be reflected by the reflecting mirror 71 toward the eye position I1 or I3.

In the on-vehicle display unit 5' of the second embodiment, the additional information projecting sub-unit 6 is received in the dashboard 1, and the projecting sub-unit projects the image, which is displayed on the display 51, on the windscreen 3 so that a virtual one S1 or S3 of the image is visible from the eye position I1 or I3 by way of the windscreen 3. Therefore, an enlarged inner space is required for the dashboard 1 to accommodate the additional information projecting sub-unit 6 therein.

No forward expansion of the dashboard 1 is allowable, because the dashboard 1 is forwardly adjacent to the engine room of the vehicle. In the second embodiment, the front surface 1c of the dashboard 1 is shifted rearward in a longitudinal direction of the vehicle to enlarge the inner space of the dashboard 1.

In that case, if meter indicators (such as a digital type one like the second display 73 or an analogue type one like a pointer instrument) are mounted on the rearward shifted front wall 1c of the dashboard 1, the meter indicators is positioned nearer to the eye positions I1, I3. This causes a much difference of sight distances from the eye positions I1, I3 between when the driver looks at the foreground and when the driver looks at the meter indicators on the front wall 1c. This is disadvantageous for the driver who moves his sight line toward the foreground and toward the meter indicators.

However, the on-vehicle display unit 5' of the second embodiment is provided with the reflecting mirror 71 in place of the meter indicators mounted on the front wall 1c of the dashboard 1. Furthermore, the second display 73 is mounted on the steering column 9 extended diagonally downward from the front surface 1c of the dashboard 1 in the side of the driver. The second display 73 indicates data obtained by measuring instruments of the vehicle. The information displayed on the indication face 73a of the second display 73 is reflected by the reflecting mirror 71 so that a virtual image S of the displayed information is visible by way of the reflecting mirror 71 from the eye position I1 or I3. Thus, the virtual image S of the data obtained by the measuring instruments can maintain an appropriate sight distance even when the front face 1c of the dashboard 1 is shifted nearer to the driver.

Thus, the on-vehicle display unit can be used to see both the data obtained by the measuring instruments and the foreground without a much difference of sight distances thereof.

Figure 6:
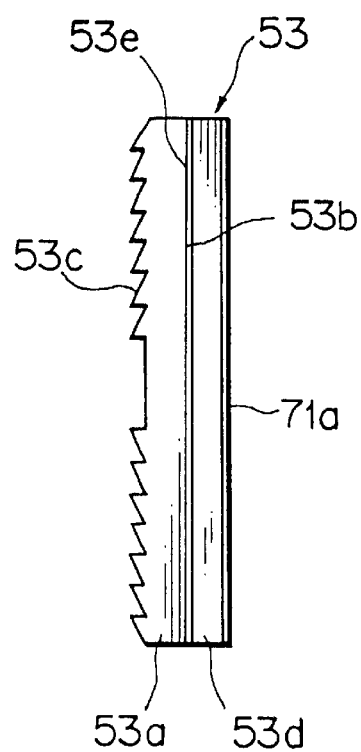
FIG. 6 is an enlarged side view showing a combined reflecting mirror of a modified embodiment of the present invention.

As illustrated in FIG. 6, the magnifying mirror 53 may have a reflection plate 53d integrated with the reflecting mirror 71. The reflection plate 53d has a reflection face 53e opposed to the indication face 51a of the display 51 and has another face which is a reflection surface 71a (corresponding to the second screen described in the invention summary).

In the second embodiment, the additional information projecting sub-unit 6 has the semi-transparent mirror 55 for delivering the image on the display panel 51a of the display 51 onto the windscreen 3. However the semi-transparent mirror 55 may be an ordinary reflecting mirror for reflecting the image toward the windscreen 3, or the image on the display panel 51a of the display 51 may be directly delivered onto the windscreen 3.

In the second embodiment, the transfer mechanism 67 can move the semi-transparent mirror 55 in a longitudinal direction of the vehicle in accordance with a vertical position change of the eye positions I1, I3. However, the transfer mechanism 67 may be omitted if it is not desired.

In the present invention, the inclination angle of the semi-transparent mirror 55 may be configured to be adjustable to vary vertically the projection point P1 or P3 of the superimposed image on the windscreen 3.

The Fresnel lens 53a for magnifying the superimposed image may be omitted if it is not desired.

What is claimed is:

1. An on-vehicle display unit for projecting an image on a screen, the image displayed on a display in a dashboard of a vehicle, the screen disposed outside the dashboard, the screen being transparent so that the foreground is visible through the screen with the image projected on the screen being superimposed over the foreground, the on-vehicle display unit comprising:

a reflecting mirror disposed in the dashboard for reflecting light emitted from the image displayed on the display toward the screen, a semi-transparent mirror disposed in the dashboard between the display and the reflecting mirror, the semi-transparent mirror being able to pass partially and to reflect partially light emitted from the image on the display, and an angle changing mechanism for selectively changing the semi-transparent mirror relative to a longitudinal direction of the vehicle into a first inclination angle position or a second inclination angle position, wherein the semi-transparent mirror partially reflects the light of the image displayed on the display toward the screen when the semi-transparent mirror is at the first angle position, and the semi-transparent mirror partially reflects light reflected by the reflecting mirror toward the screen when the semi-transparent mirror is at the second angle position.

2. The on-vehicle display unit as claimed in claim 1 wherein the angle changing mechanism has a shaft extended in a lateral direction of the vehicle for turning the semi-transparent mirror around the shaft to selectively change the semi-transparent mirror into the first angle position or into the second angle position.

3. The on-vehicle display unit as claimed in claim 1, which further comprises an image magnifying optical element disposed in the dashboard such that light from the reflecting mirror to the semi-transparent mirror passes through the image magnifying optical element for magnifying the image.

4. The on-vehicle display unit as claimed in claim 3 wherein the image magnifying optical element is a Fresnel lens having a flat surface at one side thereof and a Fresnel surface at the other side thereof, the flat surface facing the reflecting mirror in an optical direction of the image emitted from the display.

5. An on-vehicle display unit having a projecting sub-unit disposed in the dashboard for projecting an image on a first screen disposed above the dashboard, the image displayed on a first display in a dashboard of a vehicle, the first screen being transparent so that the foreground is visible from an eye position of a driver through the first screen with the image projected on the screen being superimposed over the foreground, the on-vehicle display unit comprising:

a second screen disposed nearer to the eye position than the projecting sub-unit for projection of information obtained by measuring instruments of the vehicle, the second screen being visible directly from the eye position, and a second display disposed nearer to the eye position than the dashboard for indicating the information of the measuring instruments, wherein a virtual image of the information obtained by the measuring instruments is visible from the eye position by way of the second screen, wherein the projecting sub-unit has a reflecting mirror for reflecting light emitted from the image displayed on the first display toward the first screen, wherein the projecting sub-unit has a second reflecting element spaced from the first display in a longitudinal direction of the vehicle, and the reflecting mirror is a semi-transparent mirror which can pass partially light emitted from the first display toward the second reflecting element, the second reflecting element reflecting the light toward the semi-transparent mirror such that the light is reflected toward the first screen by the semi-transparent mirror, and wherein the second screen is another reflecting mirror, and the on-vehicle display unit has a combined plate extended substantially perpendicular to an optical axis of light emitted from the image displayed on the first display, the combined plate having a first surface facing the first display and a second surface facing the eye position, the second reflecting element defined in the first surface, the second screen defined in the second surface.

6. An on-vehicle display unit having a projecting sub-unit disposed in the dashboard for projecting an image on a first screen disposed above the dashboard, the image displayed on a first display in a dashboard of a vehicle, the first screen being transparent so that the foreground is visible from an eye position of a driver through the first screen with the image projected on the screen being superimposed over the foreground, the on-vehicle display unit comprising:

a second screen disposed nearer to the eye position than the projecting sub-unit for projection of information obtained by measuring instruments of the vehicle, the second screen being visible directly from the eye position, and a second display disposed nearer to the eye position than the dashboard for indicating the information of the measuring instruments, wherein a virtual image of the information obtained by the measuring instruments is visible from the eye position by way of the second screen, wherein the projecting sub-unit has a reflecting mirror for reflecting light emitted from the image displayed on the first display toward the first screen, and wherein the reflecting mirror of the projecting sub-unit is movable in an optical axis direction of the light emitted from the image displayed on the first display.

7. The on-vehicle display unit as claimed in claim 6, wherein the projecting sub-unit has a second reflecting element spaced from the first display in a longitudinal direction of the vehicle, and the reflecting mirror is a semi-transparent mirror which can pass partially light emitted from the first display toward the second reflecting element, the second reflecting element reflecting the light toward the semi-transparent mirror such that the light is reflected toward the first screen by the semi-transparent mirror.

* * * * *